United States Patent [19]

Creedon

[11] Patent Number: 4,771,530

[45] Date of Patent: Sep. 20, 1988

[54] APPLICATION OF INWARDLY DIRECTED PRESTRESSING PRESSURE TO CONCRETE MEMBERS

[75] Inventor: Richard L. Creedon, San Diego, Calif.

[73] Assignee: General Atomics, San Diego, Calif.

[21] Appl. No.: 36,101

[22] Filed: Apr. 8, 1987

[51] Int. Cl.[4] ........................ B23P 17/00; B28B 1/30; B28B 1/48; B29C 45/14

[52] U.S. Cl. ................................ 29/421.1; 29/527.2; 264/155; 264/228; 264/262; 264/263; 264/512; 264/576; 264/570

[58] Field of Search ............... 264/228, 229, 333, 261, 264/262, 328.2, 263, 573, 512, 516, 570, 154–156; 29/421 R, 527.2

[56] References Cited

U.S. PATENT DOCUMENTS

| | | | |
|---|---|---|---|
| 1,965,748 | 7/1934 | Mitchell | 72/54 |
| 2,048,253 | 7/1936 | Freyssinet | 25/41 |
| 2,585,446 | 2/1952 | Edwin et al. | 25/154 |
| 2,683,915 | 7/1954 | Tournon | 25/154 |
| 2,709,845 | 6/1955 | Serkin | 25/154 |
| 3,202,740 | 8/1965 | Patin | 264/100 |
| 3,249,665 | 5/1966 | Bearden et al. | 264/94 |
| 3,260,020 | 7/1966 | Patin | 264/228 X |
| 3,397,260 | 8/1968 | Lamberton | 264/36 |
| 3,567,816 | 3/1971 | Embree | 264/228 |
| 3,687,380 | 8/1972 | Magers et al. | 242/7.21 |
| 3,737,493 | 6/1973 | Hacker | 264/262 X |
| 4,005,828 | 2/1977 | Peszeszer | 242/7.21 |
| 4,071,996 | 2/1978 | Muto et al. | 264/35 X |
| 4,153,656 | 5/1979 | Bunyan | 264/262 X |
| 4,247,516 | 1/1981 | Morgan | 264/228 X |
| 4,529,567 | 7/1985 | Richard | 264/228 |

FOREIGN PATENT DOCUMENTS

| | | |
|---|---|---|
| 222557 | 2/1961 | Austria . |
| 741460 | 11/1969 | Belgium . |
| 270111 | 9/1978 | Fed. Rep. of Germany . |
| 179238 | of 0000 | Sweden . |

OTHER PUBLICATIONS

Brochure: "Prestressed Concrete Cylinder Pipe", published by Ameron Pipe Products Group of American Pipe and Construction International, (6/74), 4 pages.

*Primary Examiner*—Jan H. Silbaugh
*Assistant Examiner*—Karen D. Kutach
*Attorney, Agent, or Firm*—Fitch, Even, Tabin & Flannery

[57] ABSTRACT

Methods for forming prestressed concrete members wherein a pressure-containing casing is disposed around the outside surface of the concrete member and is spaced therefrom so that a cavity is formed between the casing and the outside surface of the concrete member. A pressurized medium is injected into the cavity between the casing and concrete member at a pressure sufficient to apply the required prestressed compressive force to the outside surface of the concrete member. The pressurized medium changes form by hardening or solidifying after injection. Examples of solid pressurized mediums include cement-like grouts and plastic, and epoxy resin materials. When the concrete member is cast within the casing so as to be in intimate contact with the casing the cavity is then formed by peeling the concrete member and casing away from each other as the pressurized medium is injected therebetween.

5 Claims, 2 Drawing Sheets

APPLICATION OF INWARDLY DIRECTED PRESTRESSING PRESSURE TO CONCRETE MEMBERS

BACKGROUND OF THE INVENTION

1. Field of the Invention

The present invention pertains to prestressed concrete structural members and in particular pertains to concrete which is prestressed using post-tensioning techniques.

2. Description of the Prior Art

Prestressed concrete plays a significant role in many of the building structures in use today. Prominent applications of prestressed concrete include: bridges, building columns, and liquid storage tanks. Common to each of these applications, is the goal of eliminating tension forces in concrete load-bearing members, since concrete is notably weak in tension, but is strong in compression. In each of these applications, a prestressing force, applied prior to the concrete being loaded through use, is generated by stretching steel reinforcing members or tendons positioned internal to the concrete member. The stretched reinforcing members exert a compressive force on the concrete, which is arranged (in any one of several different ways) to prevent their relaxing.

The most common tensioning members in use today are made of steel, in the form of bars or wires, called "tendons." The tendons may be stretched through the use of hydraulic jacks or the like, and the prestressing results when the tendons are prevented by the concrete from relaxing, i.e., returning to their initial length. The tendons are usually made of high-strength steel which can satisfactorily maintain high working stresses, typically ranging between 150,000 and 180,000 pounds per square inch. These high tension levels are required to overcome losses or partial relaxation in the tension due to shrinkage and plastic flow of either the tendon or the concrete over time. It is frequently inconvenient to apply stresses of these magnitudes, especially since, prestressing must often be performed in the field. An alternative technique, not requiring the stretching of tendon members, could provide significant economic and safety-related advantages.

Prestressing is commonly accomplished in one of two ways: pretensioning or post-tensioning, and may be applied either to pre-cast members manufactured off site, or may be done in the field, at the point of use of the concrete member. In pretensioning, stretched tendons are mechanically bonded to the concrete while the concrete is being cured. However, in the post-tensioning method, reinforcing members are prevented from being bonded to the concrete, thereby allowing the members to be stretched after the concrete is cured. An example of post-tensioning will follow shortly.

In post-tensioning beams, axially-extending tendons are typically encased in sheaths to prevent bonding of the tendons to the concrete. When the concrete has been cured to a predetermined minimum strength, hydraulic jacks or the like tension the tendons by working against the ends of the beam, thereby putting the beam in compression. The compression is thereafter maintained by anchoring the tendons to the concrete, allowing removal of the hydraulic jacks. Thereafter, grout may be forced into the sheaths to establish a bond with the prestressed concrete beam. Although the grout does not add to the prestressing forces, it does advantageously impart to the prestressed beam a greater reserve strength and better crack control under overload conditions. If cracks should appear under small overloads, they generally will close when the load is removed, thereby adding to the longevity and integrity of the prestressed concrete beam.

In addition to bridges and building structures, prestressed concrete is particularly advantageous when used for liquid-containing storage tanks. Concrete tanks are superior to tanks made of steel or similar materials in that corrosion and the like problems are avoided. The objective of prestressing concrete tanks is to maintain the tank walls in compression even when they are filled with a liquid. In the post-tensioning method of prestressing concrete tanks, a track is placed on top of the concrete tank after a sufficient curing time has elapsed. A wire-winding machine, suspended from a track at the top of the tank, is employed to wrap one or more wire tendons around the cylindrical outer surface of the tank at a typical tension of the order of 150,000 to 180,000 psi. Wire-wrapped tanks are usually coated with a corrosion preventing layer, 1-inch thick or so, of pneumatically applied mortar or cement. More complete descriptions of such post-tensioning methods are given in commonly-assigned U.S. Pat. Nos. 3,687,380 and 4,005,828.

Liquid storage tanks and other concrete structures frequently employ stud-like sealing members which consist of steel bars, cast in the ends of the concrete member. The free ends of the sealing members project outwardly beyond the ends of the concrete structure to provide a means of securing the sealing structure, for example, to the end of the concrete member, by welding or the like joinder. While generally successful for providing a point of attachment, this technique fails to utilize the structural strength of the sealing membranes, typically welded steel, which, as pointed out, are embedded within the concrete tank or shell during casting of the concrete. The sealing membranes are not load-bearing and do not play a role in prestressing the concrete. These same considerations are equally applicable to hollow tubes and to cylindrical column members used as structural elements in buildings.

Prestressing techniques have also been employed in commonly assigned application Ser. No. 06/818,203, filed Jan. 13, 1986. This patent application describes an assembly for the end-wise joinder of multiple sections of a rail gun barrel to form a continuous tube. The joint resists bursting forces as a projectile is advanced through the barrel. This technique is illustrated by the butt-connection of two tubular sections. Each section is flared and has an internal cavity for receiving a pressure medium which compresses the sections together in an axial direction and applies a radially-inward force to resist bursting pressures.

The end sections of the tubes are outwardly flared and contain internally located pressure cavities within the flared region, inclined in the direction of the flare. A collar-like coupling surrounds the end section of the tubes after they are placed together. A hole is then drilled through the coupling into the flared region of each end section so as to communicate with the pressure cavity. A pressure medium, such as a liquid resin, is inserted into the cavity under pressure, and is subsequently allowed to cure so as to be transformed into its solid phase. The pressurized cavity, located in the flared end, is expandable so as to apply axial compressive stresses to the joint as well as radially inwardly-directed forces to resist bursting pressures within the tube. While generally satisfactory for joining two sections of a tube together to form a butt connection, no provision is made for the prestressed construction of a tube-like structural member, such as a hollow prestressed concrete cylinder.

SUMMARY OF THE INVENTION

It is therefore the principal object of the present invention to provide a concrete structural member which is prestressed in an inward direction so as to resist internal bursting pressures.

Another object of the present invention is to provide a prestressed structural member of the above type which has a minimum amount of reinforcing steel, the majority of which plays an active role in applying a prestress force.

Yet another object of the present invention is to provide a prestressed structural member having a minimum number of internal steel elements, both of the end sealing type and of the prestressing type.

These and other objects of the present invention, which will become apparent from studing the appended description and drawings, are provided in a prestressed concrete arrangement, which consists of a concrete member to be prestressed, disposed within an outer rigid casing which surrounds the concrete member and which may be spaced from the outer surface thereof so as to form a cavity between the casing and the outer surface. A pressurized medium disposed in the cavity applies an inwardly-directed prestress force to the concrete member.

Other objects of the present invention are provided in a method of making a prestressed concrete arrangement, wherein a concrete member is provided consisting of an outer surface and an outer rigid casing. A cavity may be formed between the casing and the outer surface of the concrete member, and then filled with a pressurized liquid medium so as to apply inwardly-directed prestress forces to the concrete member.

It will thus be seen that the objects hereinbefore set forth may readily and efficiently be attained and, since certain changes may be made in the above construction and different embodiments of the invention without departing from the scope thereof, it is intended that all matter contained in the above description or shown in the accompanying drawings shall be interpreted as illustrative and not in a limiting sense.

BRIEF DESCRIPTION OF THE DRAWINGS

In the drawings, wherein like elements are referenced alike,

FIG. 2 also shows a pretensioning steel tendon spirally wrapped about the outside surface of the concrete tube. The entire assembly is coated with an overlayer of cement;

DETAILED DESCRIPTION OF THE PREFERRED EMBODIMENT

Figure 1:
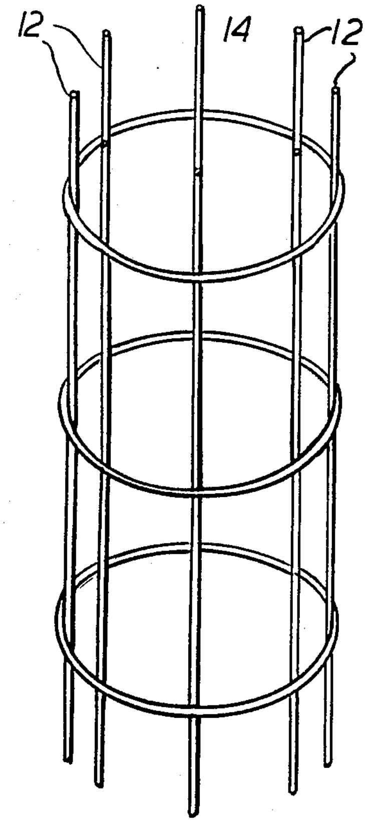
FIG 1 PRIOR ART
FIG. 1 is a perspective view of a wire frame subassembly for use in a prestressed concrete structure.
Figure 2:
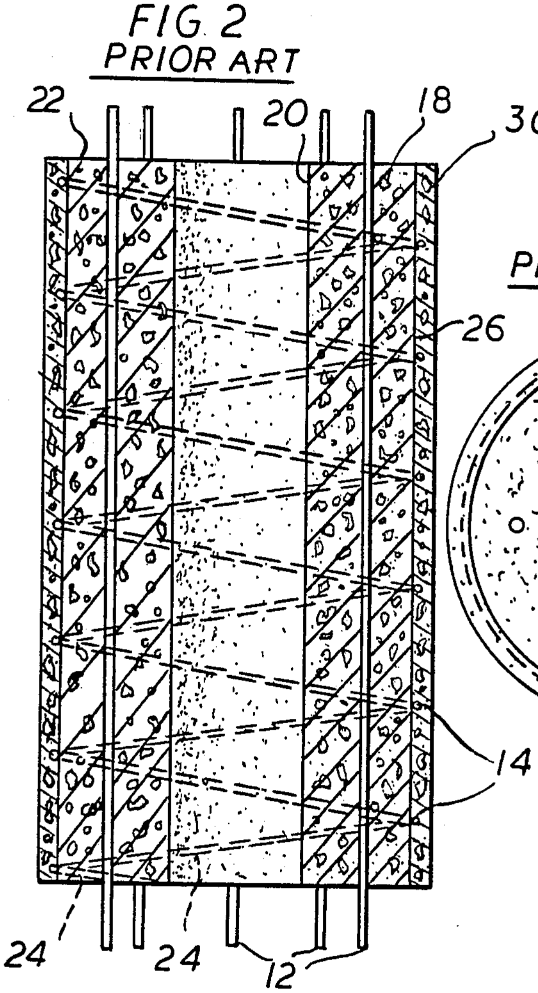
FIG 2 PRIOR ART
FIG. 2 is a longitudinal sectional view of a prestressed concrete pipe incorporating the wire subassembly of FIG. 1.
Figure 3:
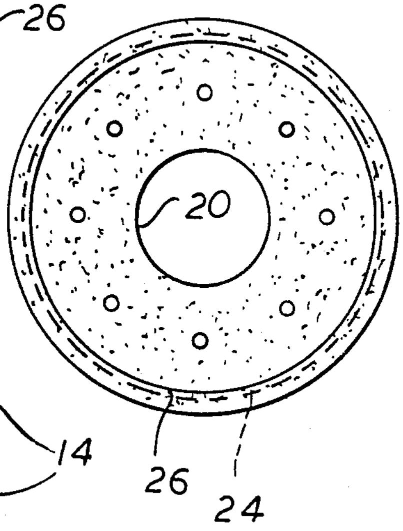
FIG 3 PRIOR ART
FIG. 3 is an end view of the assembly of FIG. 2.

Referring now to the drawings, and in particular to FIGS. 1-3, several prior art arrangements of steel members located internally of a prestressed concrete tube are shown. FIG. 1 shows a wire, cage-like structure formed by welding, wire tying or otherwise joining a plurality of axially-extending steel bars or rods 12 with a number of hoop-like cross members 14. The cross members 14 serve no function other than to conveniently arrange bars 12 in their desired position during fabrication of a concrete structure, such as the concrete cylinder shown in FIG. 2. In FIG. 2, a concrete cylinder 18 has an internal bore or opening 20 and opposed end portions 22, 24. As illustrated, FIG. 2 is more schematic in nature than a physical depiction of a known prestressed concrete cylinder. For example, The wall thickness of FIG. 2 is exaggerated for purposes of illustration. Typically, wall thickness is of the order of one-twelfth the bore diameter. Also, a significant amount of internal steel members is illustrated in FIG. 2 to accomplish a variety of objectives. For example, bars 12, as illustrated in FIG. 2, are not well suited to impart a prestress force for the kinds of loads that a concrete cylinder is normally subjected to. Rather, bars 12 are intended to represent a sealing membrane or other means of securing or fastening objects onto the ends 22, 24 of the concrete cylinder 18. Bars 12 may be used, for example, to secure multiple concrete cylinders 18 together in an end-to-end fashion. Accordingly, bars 12 have a significant portion of their length extending beyond the cylinder ends so as to provide access for ready engagement.

It is important that bars 12 be securely attached to concrete cylinder 18 since they may be placed under tension in a fastening operation. This tension, however, is not relied upon to impart a meaningful prestress to the concrete cylinder 18. Arrangements such as that illustrated in FIG. 2 are typically assembled by casting concrete material around the properly positioned internal steel members. In the illustrated arrangement of FIG. 2, concrete material is cast around the array of bars 12. To hold the bars in place during pouring of the concrete, the hoop-like cross members 14 illustrated in FIG. 1 are conveniently provided. Other arrangements for holding bars 12 in their proper positions relative to each other and to the concrete cylinder can, of course, be provided in other ways. For example, the ends of bars 12 can be engaged in a jig or frame until the concrete material has hardened. In either event, the cross members 14, if present, are not relied upon to strengthen the concrete cylinder 18 or to impart a prestress thereto.

After the concrete cylinder 18 has hardened and cured sufficiently, a continuous steel tendon 24 is wrapped about the outer surface 26 of the concrete cylinder 18. Tendon 24 may be wrapped about the concrete cylinder in a number of ways. For example, if concrete cylinder 18 comprises a vertical, prestressed concrete storage tank, the arrangements of commonly assigned U.S. Pat. Nos. 3,687,380 and 4,005,828 can be employed in a post-tensioning, prestressing arrangement. In any event, the tension in tendons 24 is quite high, being of the order of tens and even hundreds of thousands of pounds per square inch. As indicated above, the axial bars 12 and cross members 14 are not related to the pretensioning tendon 24, and do not directly cooperate therewith.

Further, although spirally-wrapped tendons are usually spaced closer together than is indicated in FIG. 2, the concrete pipe is still subjected to a series of spaced-apart pressure concentrations at its outer surface, and prestress tensions may vary from winding to winding. A stronger concrete structure could be obtained if the prestressed pressures were uniform throughout the length and surface of the concrete member. After wrapping tendon 24 over the outside surface of concrete pipe 18, an outer layer of pneumatically-applied cement 30 is applied to cover the steel tendon 24, preventing corrosion or other degradation thereof.

A considerable amount of internal steel members are present in the arrangement of FIG. 2, and their presence in the structure represents a significant labor investment. Even if the bars 12 are not used, the total length of the outer tendon 24 can be significant. For example, a vertical storage tank 20 feet in diameter and 30 feet high would require several miles of steel tendon, which obviously must be continuous and must be of a quality sufficient to withstand appreciable applied tension loads.

As mentioned above, the arrangement of FIG. 2 is generally schematic in nature. However, it will be appreciated that the labor required to fabricate and position the internal steel members used either for pretensioning or attachment, is considerable, as is the labor of applying any post-tensioning tendons. Any reduction in labor, and simplification of construction, is desirable from a commercial standpoint.

Figure 4:
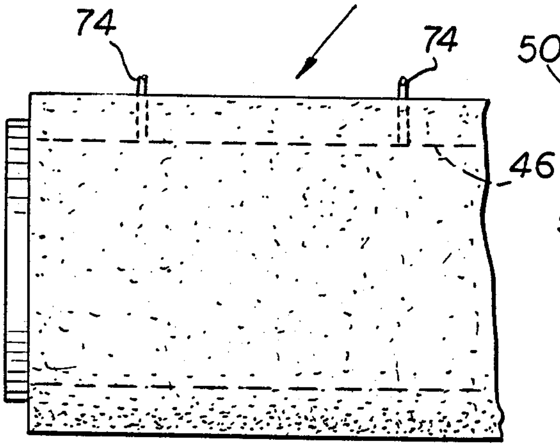
FIG. 4 is a fragmentary side elevational view of a prestressed concrete pipe constructed according to the principles of the present invention.
Figure 5:
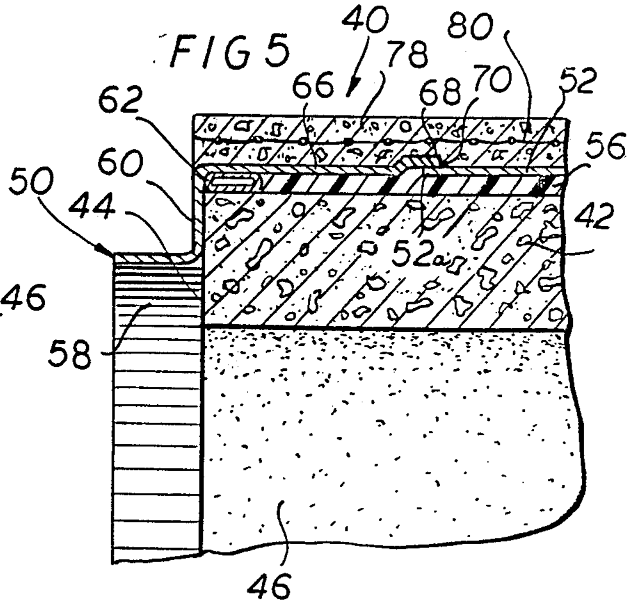
FIG. 5 is an enlarged cross-sectional view of the upper left-hand corner of FIG. 4.

FIGS. 4–5 illustrate a concrete pipe arrangement 40 which, by employing the principles of the present invention, attains these and other objectives. The concrete pipe arrangement 40 includes a cast concrete cylinder 42 having an end 44 and an inner bore defined by an inner wall 46. To reduce costs of material and especially of labor, concrete cylinder 42 does not contain interior steel members for reinforcement, attachment or the like purpose. Preferably, fabrication of concrete cylinder 42 uses conventional techniques, and does not require any special processing, such as pressurizing or otherwise treating the concrete material as it hardens. Arrangement 40 is distinguished in one aspect, by its inclusion of an outer rigid casing 50 which is generally coextensive with, and surrounds the outside surface of, concrete cylinder 42. As will be seen, casing 50 is tensioned with a relatively high tension stress, generally between 100,000 and 200,000 pounds per square inch. Accordingly, casing 50 is made of any suitable material sufficient to withstand a high tension load. In the preferred embodiment, casing 50 is made of steel and more particularly, is made from a type of steel capable of withstanding very high tensile loads, such as steel types 4130 or M220.

The embodiment illustrated in FIG. 5 shows a casing 50 with a first cylindrical body portion 52 slightly larger than the outside diameter of concrete cylinder 42, so as to form an enclosed annulus therearound, thereby creating a gap or cavity 56 between the casing and the concrete cylinder. The illustrated cavity 56 is not drawn to scale, but rather is enlarged for purposes of clarity. In this embodiment, casing 50 is installed around a previously-formed concrete cylinder. This may be accomplished in two ways. In a first manner of installation, a tube-like casing of constant internal diameter and length slightly greater than that of the concrete cylinder is positioned over the concrete cylinder, and the ends of the tube are swaged to form the necked-down end portions 58. The casing end portions 58 may be used, for example, as sealing membranes to connect the concrete pipe arrangement 40 to a similar concrete pipe or other structural member. An important feature of the swaging operation is that a lateral wall or end portion 60 of the steel tubing closely engages end 44 of the concrete cylinder so as to substantially close one end of cavity 56. In practice, lateral wall 60 is spaced from the concrete end cylinder 44 by a finite amount, rendering cavity 56 unsuitable for high-pressure containment, the purpose of which will quickly become apparent. Accordingly, a high-pressure seal 62 of flexible material is installed at one end of gap 56 immediately prior to the swaging of the steel tubing end. Seal 62 can comprise hollow or solid rings of Viton or Buna-N rubber, for example. Other gasket configurations are, of course, possible. If necessary, the axial length of necked portion 58 can be reduced by cutting the tubing after the swaging operation is completed.

As an alternative mode of installing casing 50, a separate body portion 52 is inserted over a major length of concrete cylinder 42. Body 52 is generally tubular, having a constant cross-section. The end portion of casing 50, comprising the necked portion 58, lateral wall 60 and a stub portion 66 is separately formed for subsequent connection to body 52. Stub portion 66 includes an outwardly flared or enlarged end 68 having an internal diameter corresponding to that of the outside diameter of body 52. When installed, enlarged end 58 overlaps an outer end **52*a* of tubing body portion 52, and is welded thereto at 70 to form a pressure-tight seal capable of withstanding relatively high pressures. Although the engagement between the lateral wall 60 and concrete cylinder end 44 can be more closely controlled, it is expedient to provide the high pressure seal 62**, as before.

Upon installation of casing 50 about concrete cylinder 42, and placement of pressure seals 62, a series of holes are drilled through the casing, so as to penetrate cavity 56. A series of pipe-like injection couplings 74 are attached to casing 50 and are joined thereto in a pressure-tight fashion, preferably by welding. In effect, a high pressure vessel is formed having a volume corresponding to that of cavity 56 and a series of access points 74 for injecting a fluid into the cavity. The fluid is injected through one or more couplings 74 at a pressure sufficient to provide the desired prestress about the outer surface of concrete cylinder 42. As contemplated by the present invention, injected pressures range between 100 and 30,000 psi, with casings of correspondingly appropriate size and strength. The pressurized medium injected into cavity 56 places casing 50 in tension and the concrete cylinder 42 in the desired compression.

The above discussion relative to FIG. 5 illustrates one mode of providing a pressure-containing cavity 56 for disposing a pressurized medium about the outer surface of a previously-formed concrete cylinder.

While this method of assembly is generally satisfactory, and yields a concrete article having the desired prestressed configuration, the preferred manner of carrying out the invention is to provide a casing 50 of generally tube-like configuration, and using the casing as a mold form within which the concrete cylinder 42 is cast. In this arrangement, it is convenient to dispose pressure seals 62 at either end of the mold, prior to pouring of the concrete. The pressure seals 62 will generally be contained within the concrete cylinder 42, the outer surface of the concrete cylinder being in intimate engagement with the casing 50. After the concrete cylinder is sufficiently hardened, a series of holes are drilled in the casing, to provide access to the boundary between the outer surface of cylinder 42 and the inner surface of casing 50. A series of pipe-like injection couplings 74 are attached to the casing as before to provide a series of access points for injecting a high-pressure medium into the boundary between the concrete and steel members 42, 50, respectively. As the fluid is injected through the couplings 74, the casing 50 is outwardly expanded so as to form a generally lenticular cavity between its inner surface and concrete cylinder 42. The cavity 56 is illustrated in FIG. 5 with exaggerated dimensions, for purposes of clarity. Additionally, the outer concrete surface is crushed and compressed, but by a generally smaller amount. In this preferred mode of construction, the pressurized fluid migrates outwardly from the coupling 74, through asperities in the outer concrete surface. The peel strength of the bond between the concrete and casing is small and easily overcome by the pressurized medium. In a relatively short time, and without notable difficulty, the pressurized medium entirely surrounds the concrete cylinder, extending from one end to the other, between pressure seals 62. In order to maintain pressure seals 62 in place, under pressure, the ends 58 of the steel tube are swaged to the configuration illustrated in FIG. 5 so as to provide a "stop surface" restricting axial outward displacement of the pressure seals 62 upon contact with the fluidically injected pressurized medium.

In either event, whether the concrete cylinder is formed with a steel tubing subsequently inserted therearound, or whether the concrete cylinder is formed within the steel tube, the features regarding provision of a pressure-containing cavity 56, the mode of injecting the pressure medium, and the formation of the desired prestressed configuration are virtually identical. Casting the concrete cylinder within a steel tube offers economic advantages, since the flared coupling and welding 68, 70 are eliminated and an arrangement of spacers to provide the desired gap not required, innasmuch as the fluidically-injected pressure medium, in effect, forms its own gap or cavity between the concrete outer surface and the metal casing.

Different casings may be provided for each of the above-described arrangements. In the preferred arrangement, wherein a pressurized medium is injected between the boundary of the concrete article and the outer casing, the casing is made to swell or outwardly expand under pressure, so as to at least partially form a lenticular cavity. The casing must be rigid enough to provide adequate retention of the pressurizing force without further, undesired swelling which would detract from that force. In practice, the amount of swelling and the strength of the outer casing is well-defined using known principles. If desired as an alternative, when the gap or cavity between the concrete article and outer casing is "preformed" prior to injection of the pressurized medium, the outer casing can be made rigid enough to preclude any swelling, thereby providing a prestressed concrete article having precisely defined outer dimensions. However, according to one aspect of the present invention, it is generally desirable to have the outer casing swell or expand to provide the lenticular cavity and prestressing pressurization force desired. The amount of swelling of the outer casing can be readily determined through the use of stretchable measuring tapes applied around the girth of the casing, prior to pressurization and consequent swelling. Using known principles, the amount of expansion in girth as measured by the measuring tape can provide an accurate indication of the pressurization forces applied to the concrete article.

As illustrated in FIG. 5, the seal or gasket 62 may comprise a hollow tube of resilient material. Gasket 62 is preferably made from rubber, but any flexible material may be employed. Further, the gasket 62 need not be tubular but may, for example, comprise a solid O-ring. Other commonly available gasket arrangements can also be employed.

While the pressure medium in cavity 56 may comprise a fluid, the present invention specifically contemplates a pressure medium which is fluidically injected and thereafter hardens or cures into a solid or other form which maintains the injection pressure with very little or no risk of leaking from the ends of cavity 56 or its injection fittings 74. This latter feature of a change in the form of the pressurized medium is particularly important in a practical environment where the concrete pipe arrangement is installed either above or below ground where it is subjected to the rigors of thermal expansion and contraction, the stresses of road traffic, and various impulses and pressures caused by inadvertent contact.

In particular, the present invention contemplates a high pressure medium comprising a grout of either plastic, epoxy resin or cementitious material which is fluidically injected in cavity 56 and is thereafter allowed to cure or harden into a solid form. As used herein, the terms "cement" or "cementitious materials", as applied to the pressurized medium refer to hydraulic cements and the like, which typically include calcium (e.g., calcium oxide and calcium sulfate), silicon (e.g., silicon oxide) and other similar elements, and are usable for making Portland Cement, concretes, mortars (including stuccos and plasters, such as Plaster of Paris), grouts, and other like materials. More specifically, these terms are not intended to include adhesives commonly referred to as "cements", such as vinyl cement, plastic cement, rubber cement or the like which are used to bond vinyl, plastic, rubber and other components.

By way of illustration, cylinder 42 in one example is a pre-cast concrete member, 5 feet in outside diameter, with a wall thickness of approximately 5 inches. The casing comprises steel material, of either the 4130 or M220 type, of approximately one-sixteenth inch thickness. The pressurized medium comprises a cement grout injected at over 200 p.s.i. psi and allowed to cure into a pressurized form. When employed as a pressure vessel, this concrete pipe arrangement can successfully withstand internal pressures of 200 psi without bending or other deformation.

After fabrication of casing 50 is completed and either before or after a pressurizing medium is introduced into cavity 56, an outer protective layer 78 is applied to enclose or otherwise surround the casing 50. Layer 78 preferably comprises a cementitious material pneumatically applied by spraying. Such techniques have been developed for use with conventional helically-wrapped, prestressed fluid-retaining tanks. The outer layer 78 is preferably of the order of 1 inch thickness, and may be keyed or fastened to casing 50 by a wire netting 80 wrapped about the casing 50.

One immediate application for the arrangement of FIGS. 4 and 5 is found in the field of liquid storage tanks. When used for this purpose, the longitudinal axis of the concrete arrangement is oriented in a vertical direction and is provided with a completely sealed liquid-tight bottom end closure. The upper end of the arrangement is preferably as shown in FIGS. 4 and 5, with a necked down end portion 58 readily adapted for receiving either a fixed or removable end cap. For example, the end cap be inserted over the necked portion 58, so as to be supported by a lateral wall 60. The arrangement of the present invention is particularly advantageous when used in liquid storage tanks of increased size, tens of feet in diameter and height, for example.

Figure 6:
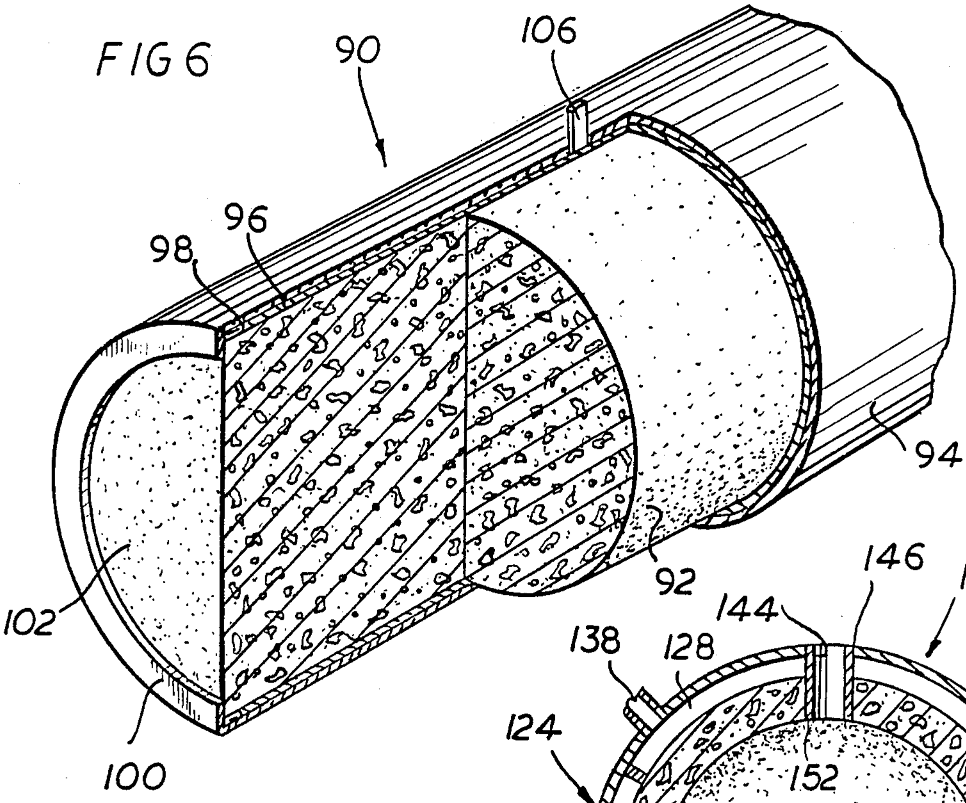
FIG. 6 is a perspective view, partially cut away, showing a pretensioned concrete column constructed according to the principles of the present invention.

Referring now to FIG. 6, a prestressed concrete column arrangement 90 is illustrated having an internal concrete column 92 surrounded by an overlying pressure-containing casing 94. When arrangement 90 is fully formed, casing 94 has an internal diameter greater than the external diameter of the concrete column 92 so as a cavity or gap 96 extends between the casing 94 and the column. The ends of the cavity 96 are sealed with resilient high-pressure gaskets 98. Casing 94 has a lateral end wall 100 at least partially overlying end 102 of column 92 so as to support gaskets 98 against outward movement when a pressurized medium is introduced into cavity 96.

As before, the preferred mode of constructing the column arrangement 90 is to use a casing 94 of tubular configuration as a molding form for receiving the poured concrete. The end wall 100 at each end of the casing may be formed either prior to or after the concrete is poured. In the former option, gaskets 98 are placed in position against the end wall to provide the proper orientation at one end of the boundary between the outer concrete surface and an inner surface of the steel casing. Alternatively, end walls 100 may be formed after the concrete is poured and set, and gaskets 98 are positioned in place adjacent each extreme end of the concrete peripheral surface. In either of these techniques, as before, injection fittings 106 are installed in casing 94 so as to extend to the boundary between the inner surface of the casing and the outer surface of the concrete. When a pressurized medium is fluidically injected through the fittings 106, the fluid displaces the outer casing (and, to a lesser extent, the concrete) to form a generally lenticular cavity 96 as the fluid migrates under pressure, in radial and longitudinal directions, along the boundary between the concrete article and outer casing, until migration is halted by gaskets 98.

As an alternative, concrete column 92 may be precast prior to the installation of casing 94. Casing 94 can be applied over the outside of column 92 in any convenient manner which provides a high-pressure containment for the cavity 96. For example, casing 94 can be comprised of two axially-extending sections, one overlapping the other for a suitable welded joinder, as explained above with reference to FIG. 5. One or more holes are drilled in casing 94 for mounting of injection fittings 106 which penetrate the cavity 96. A fluid pressurizing medium is injected through fittings 106 into cavity 96, as explained above, and is thereafter allowed to harden or cure into a solid, pressurized, leak-resistant form.

By way of illustration, the column arrangement of approximately 5 feet in diameter has a steel casing of either 4130 or M220 steel material, approximately ¼ inch in thickness and spaced from the outside surface of the concrete column 92 by a gap of approximately ½ inch. A cementitious grout material is injected in cavity 96 at a pressure of 1,500 psi, and is allowed to harden. A column 10 feet in length, for example, can successfully withstand a compressive loading of twice the unprestressed condition.

Figure 7:
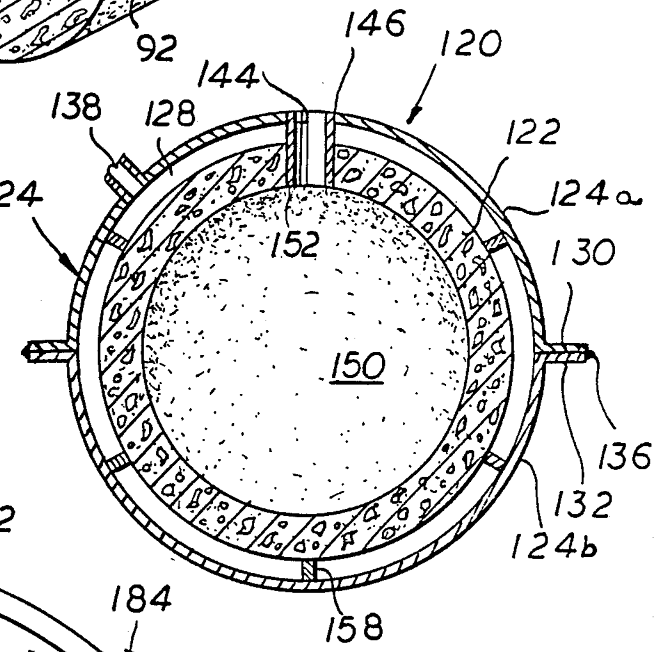
FIG. 7 is a diametric cross-sectional view of a spherical tank constructed according to the principles of the present invention.

Other forms, other than the cylindrical configurations of FIGS. 4–5 and 6 are possible. For example, referring to FIG. 7, a spherical liquid storage tank is illustrated. The storage tank 120 has an internal, hollow, pre-cast concrete shell 122, disposed within a spherical pressure-containing casing 124. Casing 124 is preferably made of steel and when the storage tank is fully formed, the casing is larger than the outer diameter of the concrete shell 122 so as to form a gap or cavity 128 between the casing and the concrete shell.

As before, the preferred mode of constructing storage tank 120 is to first fabricate a generally spherical casing 124, which is later used as a molding form for receiving poured concrete so as to form a generally hollow, spherical concrete shell 122. For ease of construction, casing 124 may be comprised of two generally hemisperical portions 124*a*, 124*b*, each having continuous mounting rings 130, 132, respectively. After the two hemispherical casing portion are mated, the outer edges of mounting rings 130, 132 are welded at 136 to form a unitary pressure-retaining casing. After the concrete shell 122 is poured and suitably hardened, an injection fitting 138 is installed in casing 124 to provide access to the interface between the outer surface of the concrete shell 122 and the inner surface of metallic casing 124. A pressure medium is fluidically injected through fitting 138 and migrates outwardly from the fitting along the interface so as to expand the outer casing 124 and, if desired, slightly compress the concrete shell 122, thereby forming a generally lenticular gap or cavity 128, the relative dimensions of which are shown in an exaggerated size in FIG. 7, for purposes of clarity. In this preferred mode of construction, no spacer blocks 158 or the like are required to provide a proper spacing between concrete shell 122 and the metal casing 124.

In an alternative embodiment, the generally spherical concrete shell 122 is formed first, and the two hemispherical casing portions 124*a*, 124*b* are thereafter positioned to surround the concrete shell. As before, a pressure-injection fitting 138 is mounted to the metallic casing 124 to facilitate the fluidic injection of the pressure medium into a cavity 128, formed by a controlled over-sizing of the metal casing. To assist in locating the concrete shell within the metal casing, spacer blocks 158 may be employed as the hemispherical casing portions are fitted over the spherical concrete shell. When employed, spacing members 158 are not relied upon to impart a compressive force to the outer surface of shell 124, that force being provided solely by the pressurized medium injected into cavity 128.

Preferably, the pressure medium is of a type which hardens or cures after injection to form a pressurized medium in cavity 128 which changes to a form less susceptible to leaking from pressure containment of casing 124. Access to the interior of the storage vessel is provided by a tubular fitting 144 which is welded or otherwise joined at one end 146 to casing 124, and penetrates the interior 150 of concrete shell 122 at its other end 152. Fitting 144 is provided for filling and emptying the tank and may have an internally threaded bore for receiving a threaded cap, or may extend above the surface of casing 124 to provide ready connection to a sealing cap.

Figure 8:
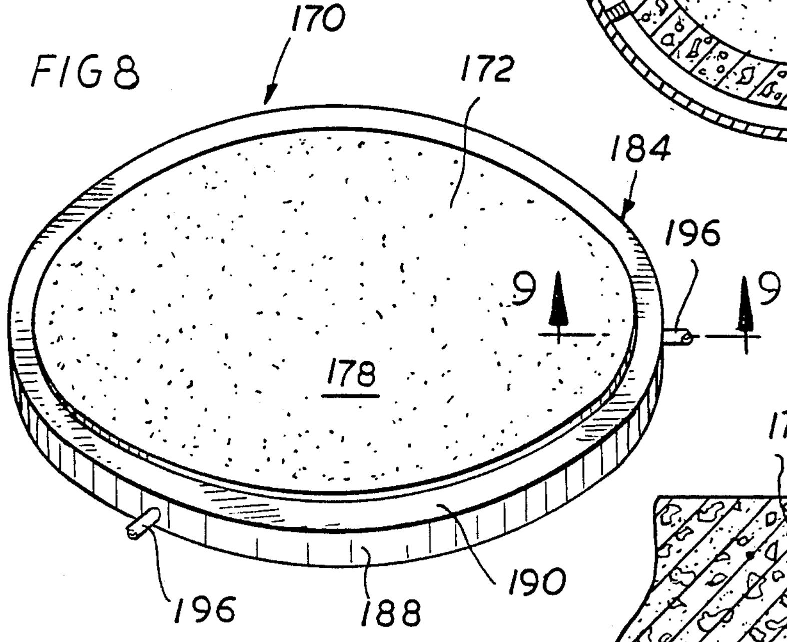
FIG. 8 is a perspective view of a prestressed concrete disk-like member constructed according to the principles of the present invention.
Figure 9:
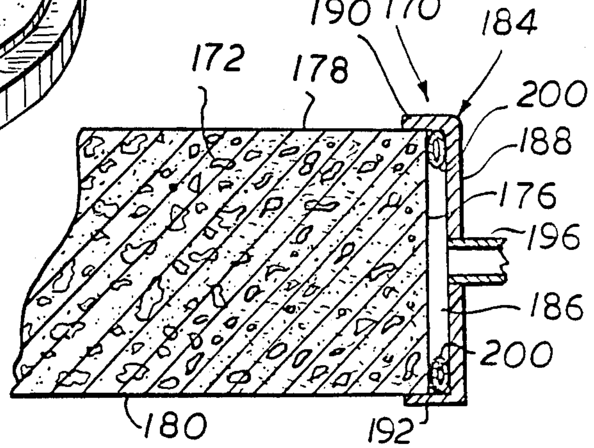
FIG. 9 is an enlarged fragmentary cross-sectional view taken substantially along the line 9—9 of FIG. 8.

Referring now to FIGS. 8 and 9, another prestressed concrete arrangement illustrating the principles of the present invention is shown. Arrangement 170 in this embodiment is disk-like in form, comprising a solid concrete slab 172 of generally cylindrical form, having a length or thickness substantially shorter than its diameter. Slab 172 as shown in FIG. 9, is generally-plinth-like, having an outer cylindrical surface or edge 176 and opposed end surfaces 178, 180. An outer band-like casing 184, generally U-shaped in cross-section, encircles the outer circumferential edge 176 of the concrete slab 172. As will be explained more fully below, a cavity 186 is located between the band-like bight portion 188 of casing 184 and the outer slab edge 176. The leg portions 190, 192 enclose the ends of cavity 186 and overlie the peripheral edge of slab 172. That is, the ring-like leg 190 of casing 184 overlies the peripheral edge of end surface 178, as does the other ring-like leg 192, with respect to the opposed end surface 180.

For ease of construction, casing 184 may be formed of two generally semicircular parts, joined together in overlapping welded fashion, as explained above with regard to FIG. 7. Alternatively, cavity 184 may be formed of two opposed rings, each generally L-shaped in cross-section, each having a first leg overlying an end surface of the concrete slab, and a second leg providing a welded joinder along the circumferential band-like bight portion 188. The two-part casing construction allows economical pre-cast fabrication of the concrete slab 172.

As in the several arrangements discussed above, the disk-like arrangement 170 may be formed either by applying casing 184 around a previously-formed concrete slab 172, or by employing the casing 184 as part of a mold form within which concrete is poured and subsequently allowed to harden into the slab-like shape. In this latter alternative, which is preferred for reasons of economy, temporary end walls overlying the legs 190 of casing 184 are compressed together to form a completely sealed molding form within which the concrete is poured, after positioning of pressure gaskets or seal members 200, adjacent casing legs 190, 192. As illustrated, seals 200 comprise hollow tubes of flexible material, such as rubber. However, as explained above, various sealing arrangements are presently available having various cross-sectional configurations, other than that of hollow flexible tubes. Initially, the poured concrete engages the inner surface of casing 184 with a bond having a relatively low peel strength. After the concrete is allowed to harden, a pressure injection fitting 196 is secured to casing 184 so as to communicate with the boundary between the outer edge 176 of the concrete slab, and the inner surface of the band-like bight portion 188 of metallic casing 184. As a pressure medium is fluidically injected through fitting 196, the medium migrates outwardly from the fitting, along the boundary between the slab edge surface 176 and the inner surface of the metal casing. The casing 184 is expanded (and if desired the concrete may be compressed) to form a generally lenticular gap 186 which is shown in exaggerated size in FIG. 9 for purposes of clarity. In the preferred embodiment, the pressure medium, in effect, forms the cavity 186. The temporary end walls may be removed either prior to or after the pressure medium is injected into the disk-like arrangement 170.

As an alternative method of construction, cavity 186 may be formed as casing 184 is applied about the edge of a pre-existing, fully-formed concrete slab 172.

Preferably, the pressurized medium injected into cavity 186 changes form while retaining its pressure level, to minimize of eliminate the risk of leakage from the pressure containment surrounding cavity 186. In the preferred embodiment, the pressurized medium comprises a cementitious grout which is allowed to harden or cure after injection to form a solid pressurized medium applying tension forces to casing 184 and prestressing compressive forces to the outer perimeter of slab 172.

In each of the above embodiments, the preferred mode of construction is to utilize an outer rigid casing, preferably formed of metal, to act as a molding form for receiving the poured concrete, to form the desired concrete article. After the concrete article has hardened or cured sufficiently, the outer rigid casing which was initially in intimate contact with the concrete as the concrete was being poured, is fitted with a pressure-injection fitting. A fluidically-injected pressure medium is injected through the fitting, and migrates along the boundary between the outer surface of the concrete article and the inner surface of the metal casing. Initially, migration may be encouraged by asperities in the concrete surface. In either event, migration is unimpeded due to the low peel strength of the bond between concrete and steel, which can be adjustably controlled by coating the steel. Oil coatings, for example, would reduce the peel strength, while resilient binder coatings would enhance the peel strength. As described above, the outer casing is expanded (and, optionally, the concrete may be compressed to form a generally lenticular cavity). If desired, concrete compression may be enhanced by injecting the pressurized medium before the concrete is completely hardened.

The pressurized medium, in effect, creates its own cavity, necessary to locate a quantity of pressurized medium sufficient to prestress the concrete article, continuously, throughout the outer surface of the article. Pressure distributions according to the invention have improved uniformity, and pressure levels are easily controlled and measured, especially when swelling of the outer casing is monitored, as discussed above.

It can be seen, therefore, that the prestressed concrete arrangements of the present invention provide a heretofore unattainable uniform pressurizing of the outer surfaces of the prestressed concrete members. Further, the prestressing is accomplished with a minimum number of easily fabricated outer casing members.

It will thus be seen that the objects hereinbefore set forth may readily and efficiently be attained and, since certain changes may be made in the above construction and different embodiments of the invention without departing from the scope thereof, it is intended that all matter contained in the above description or shown in the accompanying drawings shall be interpreted as illustrative and not in a limiting sense.

What is claimed is:

1. A method of making a prestressed concrete arrangement, comprising the steps of:

providing an outer, rigid casing;

casting a concrete member within said casing so as to form a boundary where an outer surface of said concrete member is in intimate contact with an inner surface of said casing; and fluidically injecting a pressurized liquid medium into said boundary to separate said concrete member and said rigid casing so as to form a cavity therebetween thereby applying inwardly directed prestressing pressure to said concrete member, and to fill said cavity with said pressurized medium so as to maintain said prestressing pressure on said concrete member.

2. The method of claim 1 further comprising the step of hardening said pressurized liquid medium so as to provide a solid pressurized medium in said cavity which applies said inwardly directed prestressing pressure to said concrete member.

3. The method of claim 1 wherein said fluidic injecting step comprises the step of penetrating said outer casing so as to form an aperture communicating with said boundary between said concrete member and outer casing through which said pressurized medium is injected and said casting step comprises the step of forming void means in said outer concrete surface to initiate peeling of said concrete member and outer casing away from each other to initiate a migration of said pressurized medium along said boundary.

4. The method of claim 1 wherein said concrete member comprises a cylinder, and said casing comprises a cylindrical sleeve having end portions, said method further comprising the step of sealing said cavity adjacent ends of said concrete cylinder; and providing inlet means in said cylindrical sleeve for introducing said pressurized medium in said cavity.

5. The method of claim 4 wherein said cylindrical sleeve comprises a metal structure, said method further comprising the step of encasing an outer surface of said cylindrical sleeve in corrosion-resistant cementitious material.

* * * * *